US009586843B2

United States Patent
Morrison

(10) Patent No.: US 9,586,843 B2
(45) Date of Patent: Mar. 7, 2017

(54) SYSTEM AND METHOD FOR THE TREATMENT OF LIQUID WASTE IN ZERO GRAVITY

(71) Applicant: Hamilton Sundstrand Space Systems International, Inc., Windsor Locks, CT (US)

(72) Inventor: Terrell Lee Morrison, League City, TX (US)

(73) Assignee: HAMILTON SUNDSTRAND SPACE SYSTEM INTERNATIONAL, INC., Windsor Locks, CT (US)

( * ) Notice: Subject to any disclaimer, the term of this patent is extended or adjusted under 35 U.S.C. 154(b) by 73 days.

(21) Appl. No.: 14/524,111

(22) Filed: Oct. 27, 2014

(65) Prior Publication Data

US 2016/0115052 A1  Apr. 28, 2016

(51) Int. Cl.
| | |
|---|---|
| A47K 11/12 | (2006.01) |
| B01D 35/027 | (2006.01) |
| B64G 1/60 | (2006.01) |
| B64G 1/66 | (2006.01) |
| C02F 1/68 | (2006.01) |
| C02F 1/72 | (2006.01) |
| C02F 1/00 | (2006.01) |
| C02F 1/78 | (2006.01) |
| C02F 103/00 | (2006.01) |
| B01D 29/00 | (2006.01) |

(52) U.S. Cl.
CPC .............. *C02F 1/688* (2013.01); *B64G 1/60* (2013.01); *B64G 1/66* (2013.01); *C02F 1/001* (2013.01); *C02F 1/722* (2013.01); *C02F 1/78* (2013.01); *A47K 11/12* (2013.01); *B01D 29/0034* (2013.01); *B01D 35/027* (2013.01); *C02F 2103/005* (2013.01); *C02F 2201/001* (2013.01); *C02F 2303/22* (2013.01)

(58) Field of Classification Search
CPC ... B64G 1/52; B64G 1/60; B64G 1/66; A47K 11/12; A47K 17/003; C02F 1/687; C02F 1/688; C02F 1/72; C02F 1/722; C02F 2103/002; C02F 2103/003; C02F 2103/005; C02F 2303/02; C02F 2303/04; C02F 2303/14; C02F 2303/18; C02F 2303/185; C02F 2303/22; B01D 29/085; B01D 29/0029; B01D 29/0034; B01D 29/0036; B01D 35/002; B01D 35/023; B01D 35/027; B01D 35/0273; B01D 35/0276; B01D 35/04

See application file for complete search history.

(56) References Cited

U.S. PATENT DOCUMENTS

| | | | |
|---|---|---|---|
| 3,405,409 A | * | 10/1968 | Bennett .................... B64G 1/60 4/315 |
| 4,863,445 A | | 9/1989 | Mayhan et al. |
| 5,043,090 A | | 8/1991 | Camp et al. |
| 5,328,633 A | | 7/1994 | Hasting et al. |

(Continued)

OTHER PUBLICATIONS

DuPont, "MSDS: Oxone Pool and Spa Oxidizer," 2004.*

Primary Examiner — Lucas Stelling
(74) Attorney, Agent, or Firm — Carlson, Gaskey & Olds P.C.

(57) ABSTRACT

A waste handling assembly includes a hose with an inlet for accepting waste. A plurality of pretreatment tablets are located within the hose and are removeably attached to the hose.

12 Claims, 1 Drawing Sheet

(56) References Cited

U.S. PATENT DOCUMENTS

| | | | |
|---|---|---|---|
| 5,398,347 A | 3/1995 | Luedtke et al. | |
| 5,406,650 A * | 4/1995 | Einbinder | A47K 11/12 |
| | | | 383/100 |
| 5,567,389 A | 10/1996 | Birbara et al. | |
| 5,660,821 A | 8/1997 | Birbara et al. | |
| 5,876,707 A | 3/1999 | Birbara et al. | |
| 6,093,387 A | 7/2000 | Birbara et al. | |
| 6,875,350 B2 * | 4/2005 | Allard | B01D 29/27 |
| | | | 210/170.03 |
| 8,046,848 B2 | 11/2011 | Birbara et al. | |
| 2003/0141233 A1 * | 7/2003 | Allard | C02F 1/286 |
| | | | 210/198.1 |
| 2013/0318701 A1 | 12/2013 | Stapleton et al. | |
| 2014/0242718 A1 | 8/2014 | Hwang | |

* cited by examiner

SYSTEM AND METHOD FOR THE TREATMENT OF LIQUID WASTE IN ZERO GRAVITY

BACKGROUND

Excluding diapers, there are currently two solutions regarding urine management in orbit. The first solution is to vent the urine overboard, which has been employed on the Shuttle Orbiter and other prior United States spaceships. The second solution is to stow the urine on board, which has been employed in the Soviet/Russian Soyuz spaceship and the International Space Station. Stowing urine on board has become the desired approach for new spacecraft.

In spacecraft urinal systems, where urine is collected and stored over long periods of time, the pretreatment of urine is of eminent importance. It has been found that pretreatment serves to increase the reliability of such systems and serves to reduce the amount of maintenance time for cleaning and repairing system hardware. In particular, pretreatment of urine is required in spacecraft urinal systems to control odors, fix urea, and control microbial growth. In addition, pretreatment is required to reduce or eliminate fouling of the hardware and plumbing with urine precipitates and thereby assure long term use of urine collection equipment.

Typically urine contains about 96 percent water and about 4 percent solids in solution. About half of the solids consist of urea, $(NH_2)_2 CO$, while the remainder of the solids include chloride, sodium, potassium, nitrogen, ketosteroids, phosphate, sulfur, ammonia, creatinine, and uric acid. Without some form of pretreatment, many of the constituents of urine will decompose at room temperature and will become contaminated with bacteria, which will result in further decomposition. In particular, urea decomposes resulting in the formation of ammonia and carbon dioxide, and a significant amount of solids precipitate out of solution resulting in the fouling of urine collection equipment. Additionally, the evaporation of water in urine, resulting from air entrainment therein, facilitates the precipitation of urine salts.

Historically, the space shuttle has used a shuttle urine pretreatment assembly (SUPA) to handle pretreating the urine. However, the shuttle urine pretreatment assembly requires replacing an entire section of a urine inlet hose on a daily basis. Depending on the length of the mission, the spacecraft must carry and store multiple shuttle urine pretreatment assemblies for the crew members. The shuttle urine pretreatment assemblies are heavy and require a significant amount of space for storage. Therefore, there is a need for a light weight shuttle urine pretreatment assembly that can be easily stored and replaced.

SUMMARY

A waste handling assembly includes a hose with an inlet for accepting waste. A plurality of pretreatment tablets are located within the hose and are removeably attached to the hose.

These and other features of the disclosed examples can be understood from the following description and the accompanying drawings, which can be briefly described as follows.

DETAILED DESCRIPTION

Figure 1:
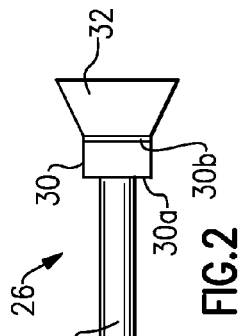
FIG. 1 shows an example waste containment system.

FIG. 1 illustrates a waste containment system 20 for use in zero gravity environments, such as on a space shuttle or space station. The waste containment system 20 includes a holding tank 22, a solid waste inlet 24, and a liquid waste inlet assembly 26.

Figure 2:
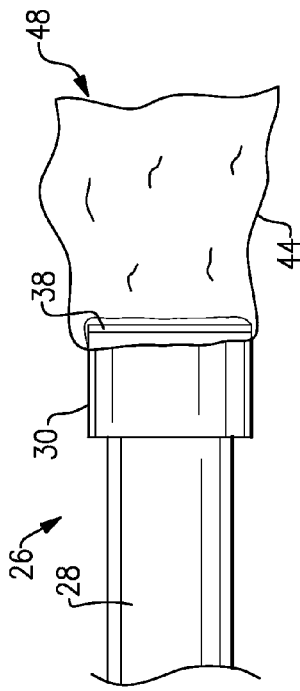
FIG. 2 shows an example liquid waste inlet assembly.

As shown in FIG. 2, the liquid waste inlet assembly 26 includes a flexible hose 28 that extends between the holding tank 22 and a collar 30. In the illustrated example, the flexible hose 28 is continuous between the collar 30 and the holding tank 22. The collar 30 is fixed to a distal end of the flexible hose 28 on a first end 30a of the collar 30 and includes a funnel 32 located adjacent a second opposite end 30b of the collar 30. Although the collar 30 is shown in the illustrated example attached to the flexible hose 28, the collar 30 could be eliminated so that the funnel 32 attaches directly to the flexible hose 28.

Figure 3:
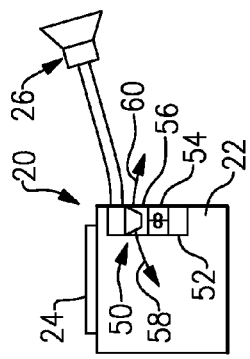
FIG. 3 shows a cross section of the liquid waste inlet assembly of FIG. 2.
Figure 5:
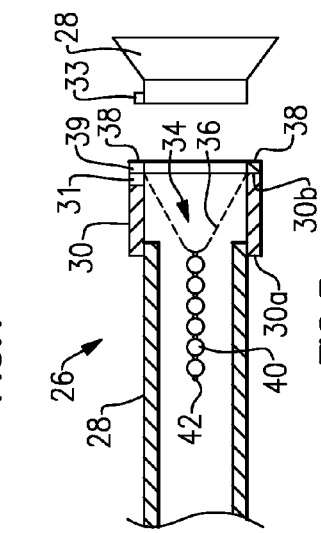
FIG. 5 shows the disposable container surrounding the distal end of the liquid waste inlet assembly.

As shown in FIG. 3, the liquid waste inlet assembly 26 includes a pretreat assembly 34. The pretreat assembly 34 includes a conical filter 36 attached to a plurality of pretreatment tablets 40 at a first end and a rim portion 38 at a second end. The rim portion 38 forms a generally circular ring that abuts the second end 30b of the collar. The rim portion 38 is secured to the collar 30 when the funnel 32 is attached to the collar 30. The rim portion 38 can includes a plurality of axial slots 39 that each align with one of a plurality of circumferential slots 31 in the collar 30 to receive one of a plurality of tabs 33 located on a distal end of the funnel 32. Each of the plurality of the tabs 33 can be received within one of the axial slots 39 and then rotated into one of the plurality of circumferential slots 31 to lock the funnel 32 from moving axially relative to the collar 30.

Although only one of the plurality of tabs 33, axial slots 39, and circumferential slots 31 is shown in the illustrated example, the plurality of tabs 33, axial slots 39, and circumferential slots 31 would be circumferentially spaced around the funnel 32 and the collar 30, respectively.

In the illustrated example, the plurality of pretreatment tablets 40 is located within a liquid permeable bag 42. The permeable bad 42 provides support to the pretreatment tablets 40 in order for them to be located linearly or in series along an axial length of the flexible hose 28. The plurality of pretreatment tablets 40 are made of a substance, a peroxymonosulfate, such as Oxone, or another suitable pretreatment chemical, that prevents the liquid waste, such as urine, from contributing to the formation of solids within the holding tank 22. The plurality of pretreatment tablets 40 are located in series to increase the amount of contact the plurality of pretreatment tablets 40 have with the liquid waste. By pretreating the liquid waste with the pretreatment tablets 40, the formation of solids caused by a high concentration of urine in the holding tank 22 is reduced. This increases the easy of emptying, flushing, and sterilizing the holding tank 22 and the remaining components of the waste containment system 20 after use.

During operation of the waste containment system 20, a waste processing unit 50 aids in drawing the liquid waste into the waste inlet assembly 26 and separating the liquid waste from air. The waste processing unit includes a motor 52 that drives a fan 54 to create an airflow into the liquid waste inlet assembly 26 to draw the liquid waste into the holding tank 22 past the pretreat assembly 34. (FIG. 1). The inward air flow is needed to draw the liquid waste through the waste inlet assembly 26 because the waste containment system 20 is used in a zero gravity or near zero gravity environment. When the fan 54 draws in the liquid waste, a separator 56 separates the liquid waste 58 from the air 60 and vents the air 60 from the waste containment system 20 and directs the liquid waste 58 into the holding tank 22.

Figure 4:
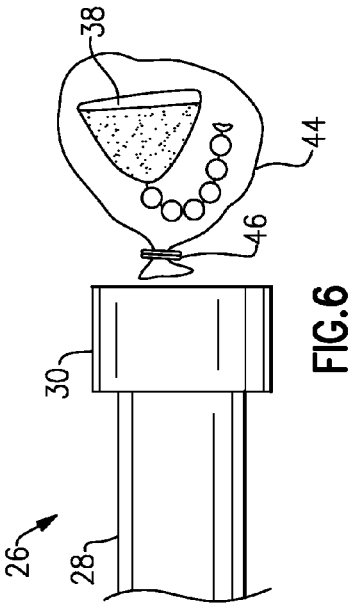
FIG. 4 shows a disposable container attached to a distal end of the liquid waste inlet assembly.
Figure 6:
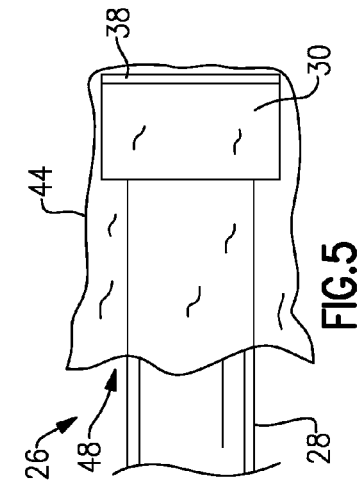
FIG. 6 shows a pretreat assembly located within the disposable container.

The pretreat assembly 34 can be removed and replaced by rotating the funnel 32 relative to the collar 30 and moving the funnel 32 axially away from the collar 30. However, the method of replacing the pretreat assembly 34 is not limited to applications where the funnel 32 is rotatably attached to the collar 30. As shown in FIG. 4, a disposable container 44, such as a rubber glove or a plastic bag, is placed around and outer diameter of the collar 30 such that that disposable container 44 surrounds the rim portion 38 and at least a portion of the collar 30. Once the disposable container 44 is surrounding the rim portion 38 and at least a portion of the collar 30, the disposal container is pulled towards the flexible tube 28 so that an open end 48 of the disposable container 44 surrounds the flexible hose 28.

A user can then grab ahold of a base portion of the disposable container 44 and separate the rim portion 38 from the collar 30. Once the rim portion 38 has been separated from the collar 30, the filter 36 and the pretreatment tablets 40 can be removed from the liquid waste inlet assembly 26. The open end 48 of the disposable container 44 can then be closed around the pretreat assembly 34 and sealed with a fastener 46 or tied in a knot to keep the used pretreat assembly 34 within the disposable container 44.

Because the pretreat assembly 34 does not include a piece of the flexible hose 28, the disposable container 44 containing the pretreat assembly 34 can then be disposed of in a Progress module for disposal from the space shuttle or space station and not need to be carried back to earth in the case of the space shuttle.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A waste handling assembly comprising:
   a hose including an inlet for accepting waste; and
   a plurality of pretreatment tablets located within the hose, wherein the plurality of pretreatment tablets are suspended from a filter in a permeable bag and removeably attached to the inlet of the hose and the plurality of pretreatment tablets include a peroxymonosulfate and are attached to teach other in series and at least one of the plurality of pretreatment tablets are attached to the filter.

2. The assembly of claim 1, wherein the filter includes a rim portion abutting a collar attached to the hose adjacent the inlet.

3. The assembly of claim 2, further comprising a funnel that abuts the rim portion.

4. The assembly of claim 1, wherein the filter includes a conical shape and the plurality of pretreatment tablets are attached to a distal end of the conical shape of the filter.

5. The assembly of claim 1, further comprising a disposable container for surrounding the inlet and the plurality of pretreatment tablets.

6. The assembly of claim 1, wherein the hose is continuous between the inlet and a holding tank.

7. The assembly of claim 1, wherein a disposable container surrounds the inlet on the hose.

8. A method of handling a liquid waste assembly comprising:
   surrounding a disposable container around a distal end of a hose inlet of a liquid waste assembly; and
   removing a pretreatment assembly from the hose inlet while the disposable container is surrounding the hose inlet, wherein the pretreatment assembly includes a filter and a plurality of pretreatment tablets suspended from the filter in a permeable bag and are removeably attached to the hose inlet.

9. The method of claim 8, wherein the assembly is configured for use in zero gravity.

10. The method of claim 8, wherein the hose includes a collar located at a distal end and the filter includes a rim portion abutting the collar.

11. The method of claim 8, wherein the plurality of pretreatment tablets are attached to each other in series and at least one of the plurality of pretreatment tablets are attached to the filter.

12. The method of claim 8, further comprising directing liquid waste into the hose inlet with a funnel by drawing air into the hose inlet.

* * * * *

UNITED STATES PATENT AND TRADEMARK OFFICE
CERTIFICATE OF CORRECTION

PATENT NO. : 9,586,843 B2
APPLICATION NO. : 14/524111
DATED : March 7, 2017
INVENTOR(S) : Terrell Lee Morrison Page 1 of 1

It is certified that error appears in the above-identified patent and that said Letters Patent is hereby corrected as shown below:

In the Claims

In Claim 1, Column 4, Line 9; after "attached to" replace "teach" with --each--

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*